United States Patent
Garcia et al.

(10) Patent No.: US 7,708,168 B2
(45) Date of Patent: May 4, 2010

(54) FLUID DISPENSER MEMBER

(75) Inventors: Firmin Garcia, Evreux (FR); Stéphane Beranger, Le Neubourg (FR)

(73) Assignee: Valois S.A.S., Le Neubourg (FR)

( * ) Notice: Subject to any disclaimer, the term of this patent is extended or adjusted under 35 U.S.C. 154(b) by 937 days.

(21) Appl. No.: 10/556,773

(22) PCT Filed: May 17, 2004

(86) PCT No.: PCT/FR2004/001211

§ 371 (c)(1),
(2), (4) Date: Aug. 8, 2006

(87) PCT Pub. No.: WO2004/103859

PCT Pub. Date: Dec. 2, 2004

(65) Prior Publication Data

US 2007/0068971 A1    Mar. 29, 2007

(30) Foreign Application Priority Data

May 20, 2003    (FR) .................................. 03 06044

(51) Int. Cl.
*G01F 11/00* (2006.01)

(52) U.S. Cl. .................................... 222/321.1; 222/339

(58) Field of Classification Search ............ 222/153.11, 222/321.1, 321.6, 321.7, 321.9, 336, 339, 222/341, 511, 514, 340

See application file for complete search history.

(56) References Cited

U.S. PATENT DOCUMENTS

| | | | | |
|---|---|---|---|---|
| 1,522,370 | A | * | 1/1925 | Thacher .................... 222/321.3 |
| 2,774,518 | A | * | 12/1956 | Greene ....................... 222/209 |
| 2003/0201284 | A1 | * | 10/2003 | Martin et al. ............ 222/321.9 |
| 2003/0209567 | A1 | * | 11/2003 | Crosnier et al. .......... 222/321.9 |

FOREIGN PATENT DOCUMENTS

| | | |
|---|---|---|
| FR | 2 131 814 A | 11/1972 |
| FR | 2 692 559 A1 | 12/1993 |
| FR | 2 705 947 A1 | 12/1994 |
| FR | 2 819 793 A1 | 7/2006 |

\* cited by examiner

*Primary Examiner*—Kevin P Shaver
*Assistant Examiner*—Daniel R Shearer
(74) *Attorney, Agent, or Firm*—Sughrue Mion, PLLC

(57) ABSTRACT

A fluid dispenser member comprising a body (1), an actuator element (2), and a return spring (3), said actuator element comprising a portion disposed inside the body and a top portion (21, 23) that projects out from the body, said actuator element being axially displaceable, downwards and upwards, inside said body between a rest position and a depressed position, said actuator element being urged towards the rest position by the return spring (3), the dispenser member being characterized in that it further comprises blocking means (14, 24, 3) for preventing the actuator element (2) from turning relative to said body (1).

11 Claims, 5 Drawing Sheets

FLUID DISPENSER MEMBER

The present invention relates to a fluid dispenser member, such as a pump or a valve, generally for mounting on an opening of a receptacle forming a fluid reservoir. The function of the dispenser member is to take fluid from the reservoir and to dispense it in a wide variety of possible forms (e.g. in the form of a spray, a stream, a drop, or a bead). Such dispenser members are very often used in the fields of perfumery, cosmetics, or even pharmacy. The dispenser member can be actuated manually by means of a finger of the hand, e.g. the index finger or the thumb, or it can be actuated mechanically so as to dispense repeatedly or rapidly.

Such a dispenser member generally comprises a body and an actuator element. The body conventionally defines a cylinder defining an internal space that can be accessed via a bottom inlet for communicating with the fluid reservoir. In its top portion, the body generally forms a collar that projects radially outwards to bear against the top edge of the opening, with a neck gasket optionally being interposed between the opening and the collar. The actuator element generally comprises a bottom portion disposed inside the body and a top portion that projects out from the body. The actuator element is axially displaceable, downwards and upwards, inside the body between a rest position and an actuated or depressed position. The actuator element is also urged towards the rest position by a return spring. When the dispenser member is a pump, the actuator element may include an actuator rod that is provided with a piston at its bottom end. At its opposite top end, the actuator rod is for co-operating with a dispenser head that may optionally be provided with a nozzle for producing a spray. The inside of the actuator rod defines a flow channel through which the fluid that is put under pressure inside the body of the dispenser member flows towards the dispenser orifice formed by the dispenser head.

With such a design, the actuator element can be axially displaced, downwards and upwards, inside the body, against the force exerted by the return spring. However, there is nothing to prevent the actuator element from turning relative to the body, about the axis of downward-and-upward displacement. As a result, the position of the dispenser orifice is not angularly stationary, and this may be problematic, particularly when the reservoir is not of a generally circularly cylindrical shape.

The object of the present invention is to remedy the above-mentioned prior-art drawback by providing blocking means for preventing the actuator element from turning relative to the body. The blocking means advantageously include a blocking element that acts between the actuator element and the body. According to an advantageous characteristic, the blocking element is formed or is constituted by the return spring. The return spring is advantageously situated outside the body and surrounds at least part of the actuator element. The return spring is therefore used to provide an additional blocking function for preventing the actuator element from turning on the body.

In a practical embodiment, the top portion of the actuator element includes an actuator rod surmounted by an annulus that projects outwards, the body includes a collar that projects outwards, the return spring bears firstly on the collar and secondly under the annulus. In addition, the blocking means may comprise blocking profiles that prevent turning and that co-operate with at least one end of the return spring so as to hold it in place. The blocking profiles may be formed on the annulus and/or on the collar. The blocking profiles preferably extend over the entire periphery of the collar or of the annulus. In a very practical embodiment, the blocking profiles are in the form of a series of radial notches, the ends of the return spring becoming engaged with the radial notches by advantageously deforming a fraction of said notches. The return spring that is generally made out of spring steel may thus bite, via its ends, into the radial notches that are made out of plastics material. This ensures that the ends of the spring are anchored onto the body and the actuator element. However, it is still possible to turn the actuator element relative to the body, by the user making a voluntary movement. Without exerting rotary torque on the actuator element, said actuator element does not turn relative to the body, even after being actuated many times.

According to another aspect of the invention, the body includes a guide bushing in which the actuator element slides, the return spring being engaged and guided around said bushing.

The invention is described more fully below with reference to the accompanying drawings which show an embodiment of the invention by way of non-limiting example.

Figure 1:
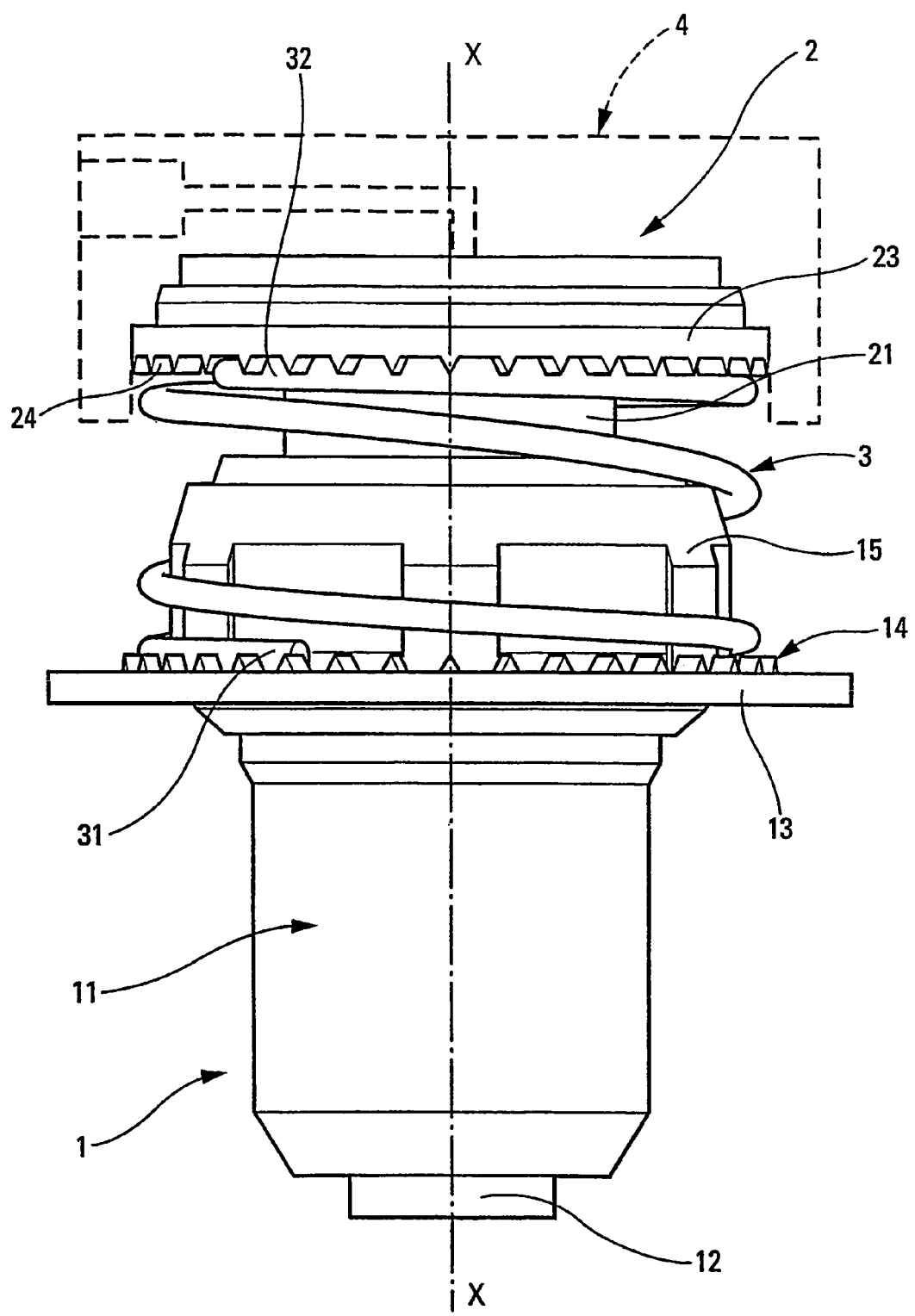
FIG. 1 is a side view of a fluid dispenser member of the invention.
Figure 2:
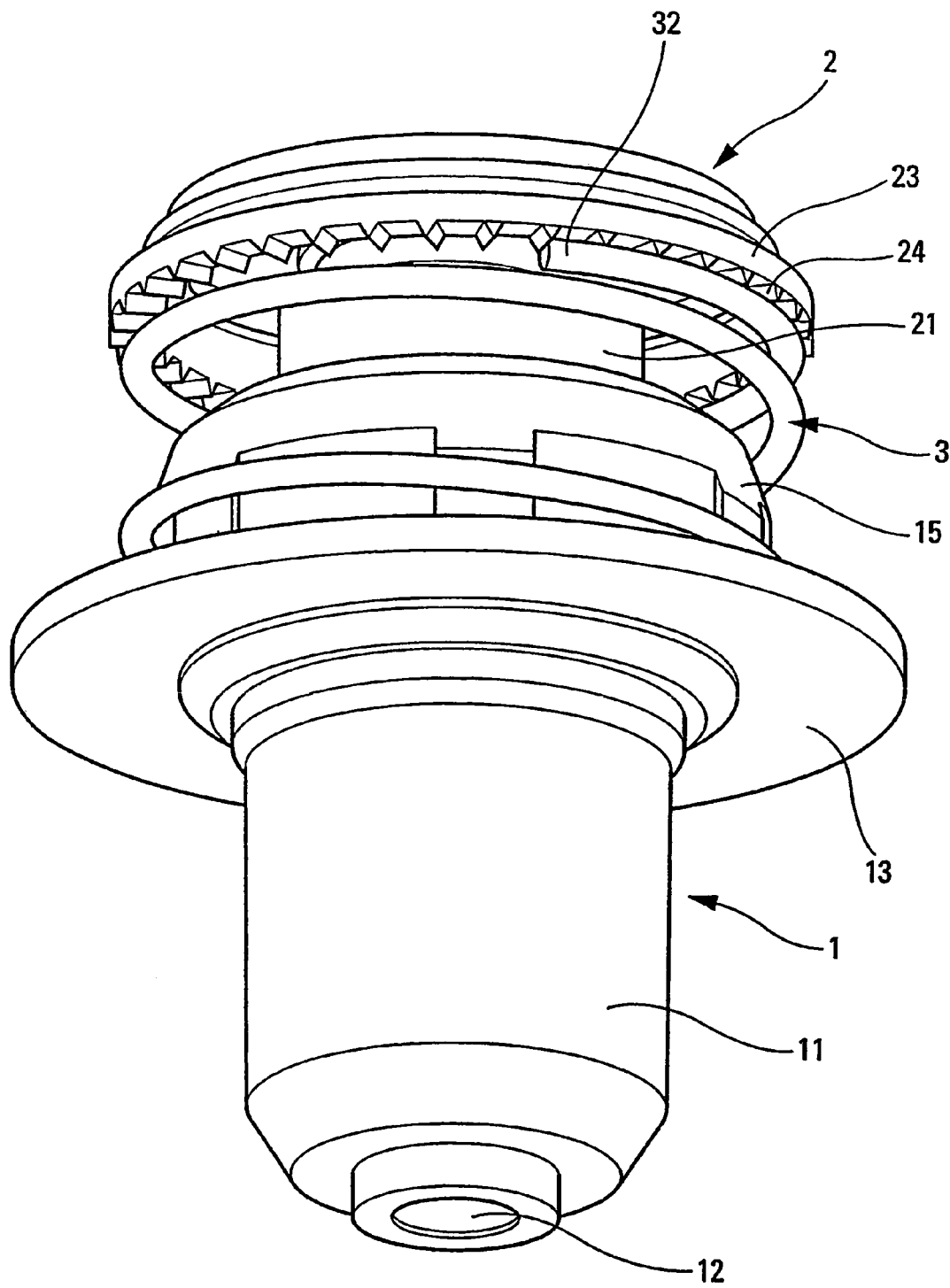
FIG. 2 is a view slightly from below of the FIG. 1 dispenser member.

The fluid dispenser member of the invention can be a pump or a valve. It comprises a body 1 and an actuator element 2. The actuator element 2 can be provided with a dispenser head 4, or in a variant, the actuator element 2 can have an integral dispenser head 4. The dispenser head is represented by dashed lines in FIG. 1. The head 4 includes an outlet channel having an end that forms a dispenser orifice adapted to produce a spray, a stream, or a drop.

The body 1 includes a cylinder 11 presenting a bottom inlet 12 for being supplied with fluid, e.g. stored in a reservoir. Above the cylinder 11, the body 1 forms a bearing collar 13 for bearing against the top edge of an opening of the reservoir containing the fluid. A gasket can optionally be interposed between the collar 13 and the top edge of the opening. A fastener member can be used to fasten the collar onto the reservoir. Above the collar 13, the body forms a guide bushing 15. The top edge of the guide bushing 15 defines an opening into the inside of the body, and more particularly of the cylinder 11.

Figure 3:
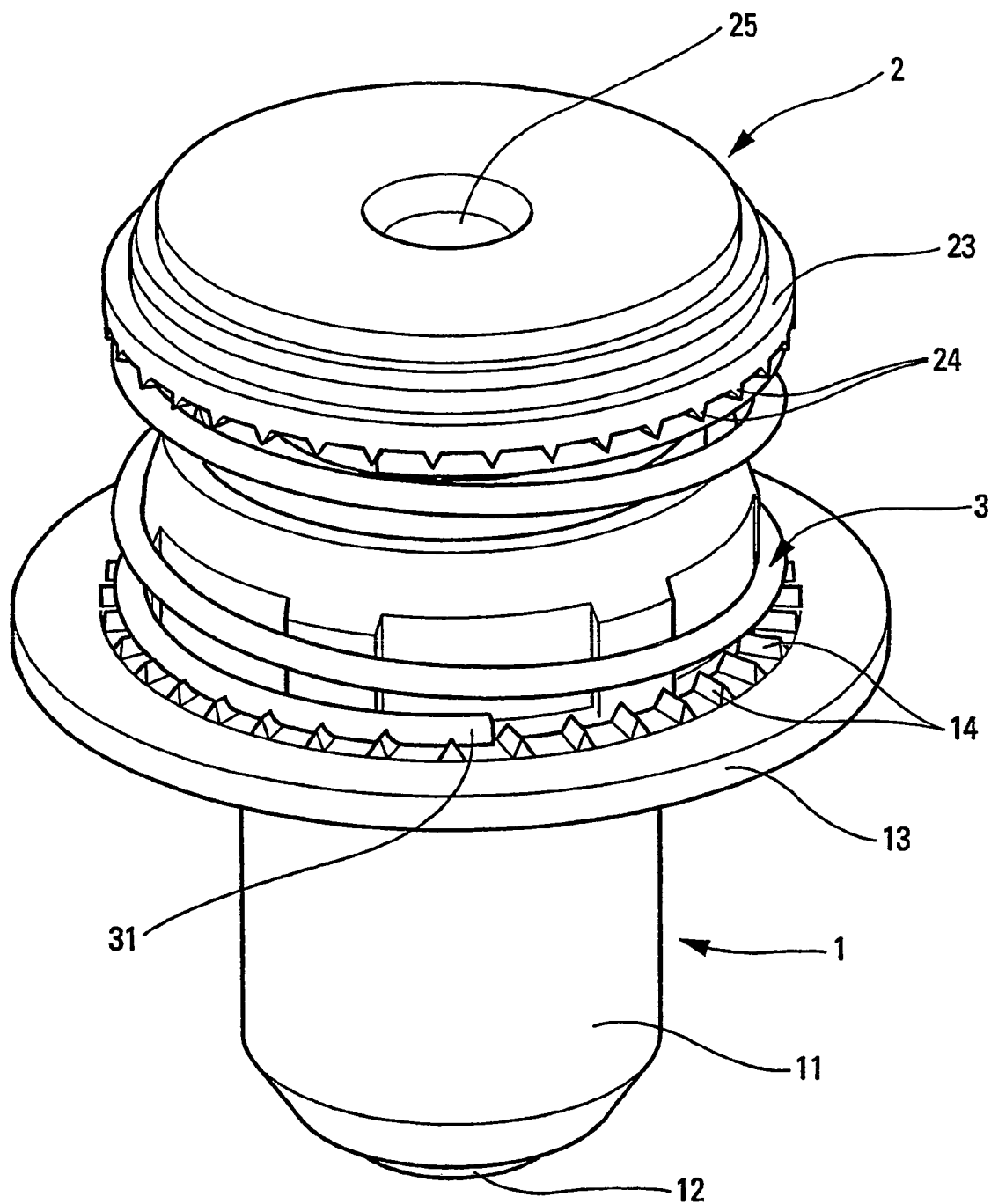
FIG. 3 is a view slightly from above of the dispenser member of the preceding figures.

The actuator element 2 includes a bottom portion (not shown) that extends into the body 1 as far as the cylinder 11. When the dispenser member is a pump, the bottom portion can comprise a piston for sliding in sealed manner inside the cylinder 11. When the dispenser member is a valve, the bottom portion can form a portion of an inlet valve. The actuator element 2 generally includes a top portion that extends out from the body 1. More precisely, the top portion projects upwards out from the opening formed by the top edge of the guide bushing 15. The top portion includes an actuator rod 21 that penetrates into the body 1. The actuator rod 21 extends inside the guide bushing 15. Above the actuator rod 21, the actuator element forms an annulus 23 that presents a diameter that is greater than the diameter of the rod 21. As a result, the outer periphery of the annulus 23 projects radially outwards relative to the rod 21. The annulus 23 co-operates with the dispenser head 4. It can also be said that the annulus 23 forms a portion of the dispenser head 4. Conventionally, the top end of the actuator rod 21 is free, and the dispenser head 4 is mounted by snap-fastening or clamping onto the free top end of the actuator rod. In the example shown in the figures, the top end of the actuator rod 21 is extended so as to form the annulus 23. As can be seen in FIG. 3, the actuator rod 21 and the annulus 23 have an internal flow duct 25 passing therethrough that opens out to the top wall of the annulus 23. The flow duct extends as far as the inside of the body 1, and more particularly of the cylinder 11. The flow duct is for the flow of fluid put under pressure inside the body 1.

As with any conventional dispenser member, the actuator element 2 is axially displaceable, downwards and upwards, inside the body 1. The axis of displacement XX shown in FIG. 1 also constitutes an axis of revolution for the body and for the actuator element 2. The actuator element 2 is thus axially displaceable, downwards and upwards, between a rest position and a depressed or actuated position. In the various figures, the actuator element 2 is in the rest position. The displacement of the actuator element 2 has the function of reducing the useful volume of a chamber inside the body 1, so as to put a quantity of fluid under pressure. For a valve, pressing the actuator element 2 into the body 1 has the effect of opening the inlet valve, so as to enable any fluid that is stored under pressure inside the reservoir to escape. The specific function of the actuator element 2 is not critical for the present invention, providing the actuator element is displaced axially, downwards and upwards, in the body 1.

The fluid dispenser member of the invention also includes a return spring 3 that urges the actuator element 2 towards the rest position. In other words, the return spring 3 tends to move away from the collar of the annulus 23. Thus, in order to press the actuator element 2 into the body 1, it is necessary to overcome the force exerted by the return spring 3. In the invention, the return spring 3 is disposed outside the body 1 and the actuator element 2. The spring 3 extends around the actuator rod 21 and around the guide bushing 15. In addition, the bushing 15 also has the function of holding the spring 3 in accurately centered manner on the displacement axis XX.

The return spring 3 includes two ends 31 and 32 that come to bear on the collar and under the annulus 23, respectively. In the invention, the ends 31 and 32 are advantageously held stationary relative to the collar 13 and the annulus 23. Thus, the return spring 3 serves as a blocking element preventing the actuator element 2 from turning relative to the body 1. In this way, the dispenser orifice formed by the actuator head presents an unchanging determined angular orientation. The ends 31 and 32 of the spring 3 do not need to be held in place relative to the collar 13 and to the annulus 23 in a permanent manner. When so desired, the user can turn the actuator element 2 relative to the body 1, by holding the body 1 securely, and by exerting a rotary force on the actuator element 2. However, it is always advantageous for the actuator element 2 not to turn relative to the body 1 while the actuator element 2 is being displaced axially, downwards and upwards, along the axis XX, so as to actuate the dispenser member. Thus, the dispenser orifice remains angularly determined, even after the dispenser member has been actuated many times.

All kinds of means can be devised to guarantee that the ends 31 and 32 of the spring 3 are held stationary, at least while the dispenser member is being actuated. By way of example, the ends of the spring could be bent, and could penetrate into corresponding housings formed in the collar 13 and the annulus 23, respectively. Adhesion or snap-fastening techniques could also be envisaged.

Figure 4:
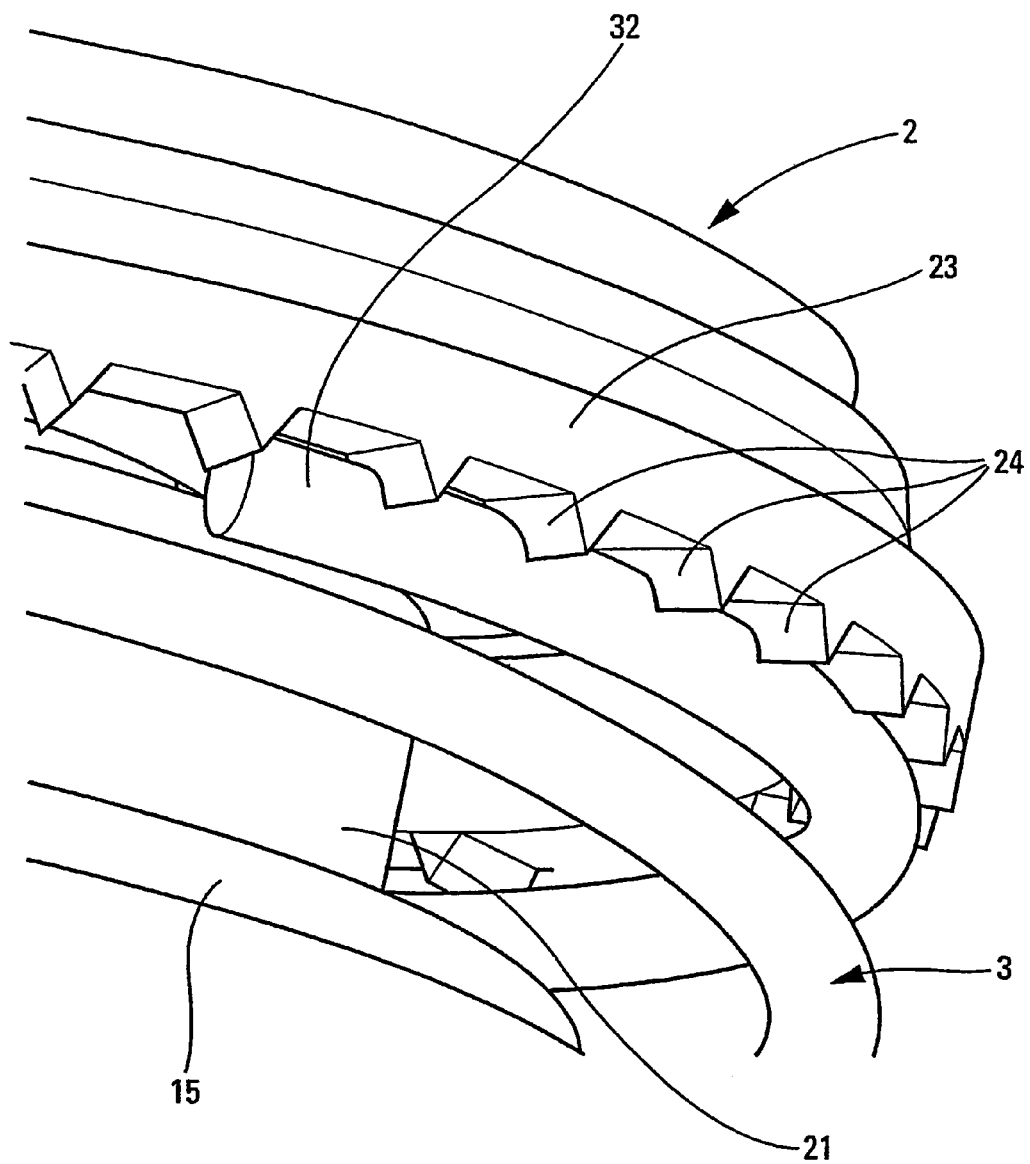
FIG. 4 is a very large-scale view, slightly from below, of a detail of the dispenser member of the preceding figures.
Figure 5:
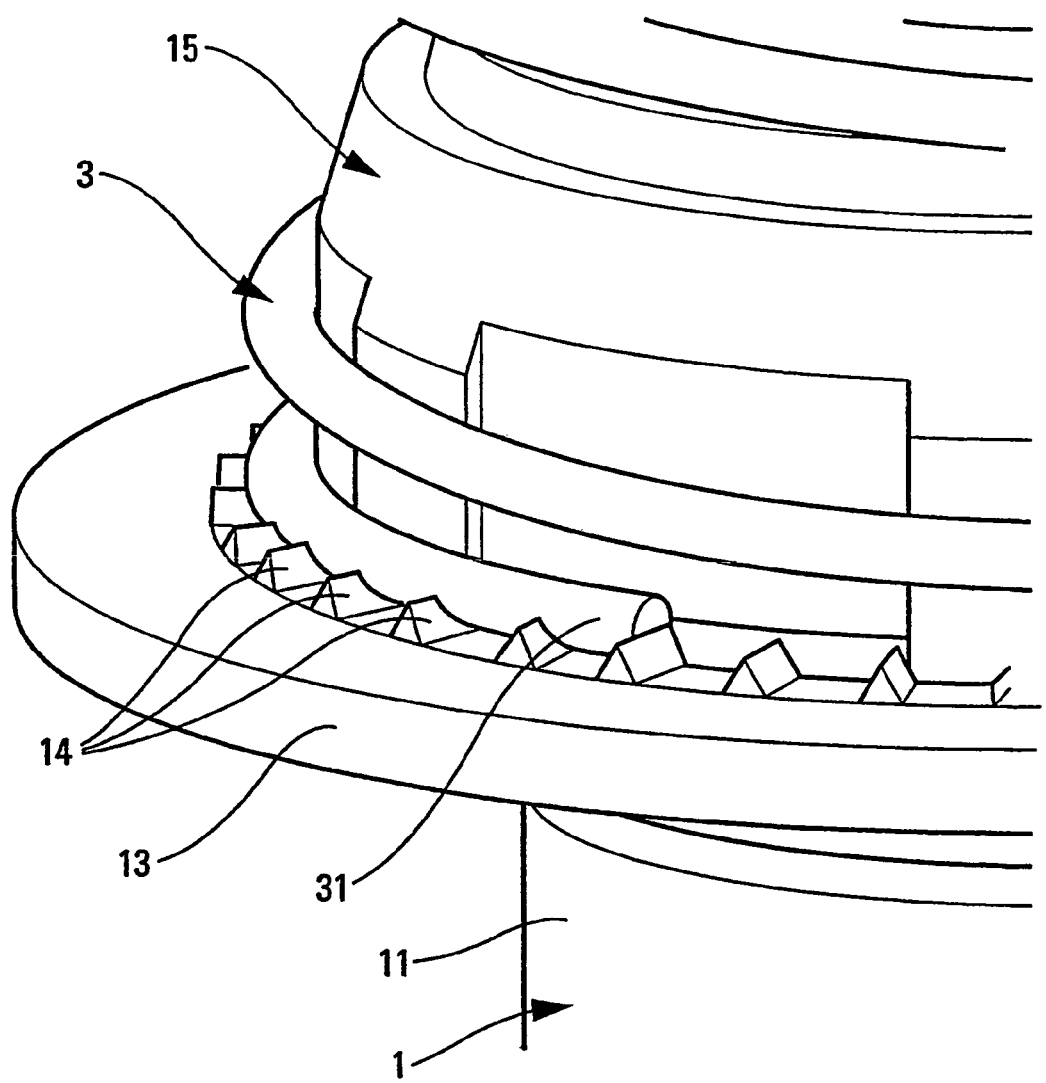
FIG. 5 is a very large-scale view, slightly from above, of the dispenser member of the preceding figures.

In the embodiment used to illustrate the present invention, in addition to the return spring 3, the blocking means also comprise blocking profiles that are preferably formed on the top face of the collar 13 and/or on the bottom face of the annulus 23. The blocking profiles of the collar 13 are designated by the numerical reference 14, and the blocking profiles of the annulus 23 are designated by the numerical reference 24. The blocking profiles 14 and 24 are advantageously identical. However, they could be different. The blocking profiles are in the form of a circular series of radial notches that are spaced apart from one another. They can extend over all or part of the periphery of the collar and/or of the annulus. The notches 14 present upwardly-pointing vertices, while the notches 24 present downwardly-pointing vertices. The respective end portions of the ends 31 and 32 of the spring 3 advantageously come into abutment against respective notches, as can be seen more clearly in FIGS. 4 and 5. It is also possible to envisage that the ends of the spring deform the notches 14 and 24 plastically, as can be seen in FIGS. 4 and 5. The deformation of the notches, associated with putting the end portions of the spring into abutment, ensures that the ends 31 and 32 of the spring are held stationary on the collar 13 and under the annulus 23, at least while the dispenser member is being actuated. However, it will readily be understood that it is also possible to cause the actuator element 2 to turn relative to the body 1 by exerting a rotary force on the actuator element 2 in the clockwise direction. Naturally, the direction in which the actuator element 2 turns is directly imposed by the right- or left-hand pitch of the return spring 3.

By means of the invention, it is possible to determine or to impose the orientation of the actuator element relative to the body 1, at least while the dispenser member is being actuated, and this advantageously by means of the return spring that also serves as a blocking element against turning.

The invention claimed is:

1. A fluid dispenser member comprising a body, an actuator element, and a return spring, said actuator element comprising a portion disposed inside the body and a top portion that projects out from the body, said actuator element being axially displaceable, downwards and upwards, inside said body between a rest position and a depressed position, said actuator element being urged towards the rest position by the return spring, the dispenser member further comprising blocking means for preventing the actuator element from turning relative to said body; and wherein the blocking means includes a blocking element that acts between the actuator element and the body;

wherein the blocking element is formed by the return spring; and wherein the top portion of the actuator element includes an actuator rod surmounted by an annulus that projects outwards, the body includes a collar that projects outwards, the return spring bears firstly on the collar and secondly under the annulus; and wherein at least one of the annulus and the collar is provided with blocking profiles.

2. A dispenser member according to claim 1, in which the return spring is situated outside the body and surrounds at least part of the actuator element.

3. A dispenser member according to claim 1, in which the blocking profiles extend over the entire periphery of the collar or of the annulus.

4. A dispenser member according to claim 1, in which the body includes a guide bushing in which the actuator element slides, the return spring being engaged and guided around said bushing.

5. A fluid dispenser member comprising a body, an actuator element, and a return spring, said actuator element comprising a portion disposed inside the body and a top portion that projects out from the body, said actuator element being axially displaceable, downwards and upwards, inside said body between a rest position and a depressed position, said actuator element being urged towards the rest position by the return spring, the dispenser member further comprising blocking means for preventing the actuator element from turning relative to said body;

wherein the blocking means include a blocking element that acts between the actuator element and the body;

wherein the blocking element is formed by the return spring; and wherein the blocking means comprise blocking profiles that prevent turning and that co-operate with at least one end of the return spring so as to hold it in place.

6. A dispenser member according to claim 5, in which the blocking profiles are in the form of a series of radial notches, the ends of the return spring becoming engaged with the radial notches by advantageously deforming a fraction of said notches.

7. A fluid dispenser member, comprising:

a body;

an actuator element; and a return spring;

the actuator element comprises a portion disposed inside the body and a top portion that projects outside of the body, the actuator element axially displaceable, downwards and upwards, inside the body between a rest position and a depressed position, the actuator element urged towards the rest position by the return spring;

wherein the dispenser member further comprises a blocking device that restricts the actuator element from turning relative to the body;

wherein the blocking device comprises a blocking element that acts between the actuator element and the body;

wherein the blocking element is formed by the return spring; and wherein the top portion of the actuator element includes an actuator rod surmounted by an annulus that projects outwards, the body includes a collar that projects outwards, the return spring bears firstly on the collar and secondly under the annulus; and wherein at least one of the annulus and the collar is provided with blocking profiles that co-operate with at least one end of the return spring so as to hold the return spring in place.

8. The dispenser member according to claim 7, wherein the return spring is situated outside the body and surrounds at least part of the actuator element.

9. A fluid dispenser member, comprising:

a body;

an actuator element; and a return spring;

the actuator element comprises a portion disposed inside the body and a top portion that projects outside of the body, the actuator element axially displaceable, downwards and upwards, inside the body between a rest position and a depressed position, the actuator element urged towards the rest position by the return spring;

wherein the dispenser member further comprise a blocking device that restricts the actuator element from turning relative to the body;

wherein the blocking device comprises a blocking element that acts between the actuator element and the body;

wherein the blocking element is formed by the return spring; and wherein the blocking device further comprises blocking profiles that prevent turning and that co-operate with at least one end of the return spring so as to hold it in place.

10. The dispenser member according to claim 9, wherein the blocking profiles are in the form of a series of radial notches, ends of the return spring configured to engage with the radial notches by advantageously deforming a fraction of the notches.

11. A fluid dispenser member comprising a body, an actuator element, and a return spring, said actuator element comprising a portion disposed inside the body and a top portion that projects out from the body, said actuator element being axially displaceable, downwards and upwards, inside said body between a rest position and a depressed position, said actuator element being urged towards the rest position by the return spring, the dispenser member further comprising blocking means for preventing the actuator element from turning relative to said body; and wherein the blocking means includes a blocking element that acts between the actuator element and the body;

wherein the blocking element is formed by the return spring; and wherein the top portion of the actuator element includes an actuator rod surmounted by an annulus that projects outwards, the body includes a collar that projects outwards, the return spring bears firstly on the collar and secondly under the annulus; and wherein the body includes a guide bushing in which the actuator element slides, the return spring being engaged and guided around said bushing.

\* \* \* \* \*